(12) United States Patent
Carmean et al.

(10) Patent No.: US 11,391,370 B2
(45) Date of Patent: Jul. 19, 2022

(54) SHIFT FORK ACTUATION ASSEMBLY

(71) Applicant: DANA HEAVY VEHICLE SYSTEMS GROUP, LLC, Maumee, OH (US)

(72) Inventors: Daniel D. Carmean, Swanton, OH (US); Robert L. Vailliencourt, Wauseon, OH (US); William F. Waltz, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 23 days.

(21) Appl. No.: 17/040,575

(22) PCT Filed: Apr. 12, 2019

(86) PCT No.: PCT/US2019/027225
§ 371 (c)(1),
(2) Date: Sep. 23, 2020

(87) PCT Pub. No.: WO2019/200260
PCT Pub. Date: Oct. 17, 2019

(65) Prior Publication Data
US 2021/0071759 A1 Mar. 11, 2021

Related U.S. Application Data

(60) Provisional application No. 62/657,006, filed on Apr. 13, 2018.

(51) Int. Cl.
*F16H 63/00* (2006.01)
*F16H 63/30* (2006.01)
*F16H 61/26* (2006.01)
*F16H 61/30* (2006.01)
*F16H 63/32* (2006.01)

(52) U.S. Cl.
CPC ......... *F16H 63/3023* (2013.01); *F16H 61/26* (2013.01); *F16H 61/30* (2013.01); *F16H 63/32* (2013.01)

(58) Field of Classification Search
CPC ...... F16H 63/3023; F16H 61/26; F16H 61/30; F16H 63/32; F16H 2061/2861; F16H 2063/3053; F16H 63/30
See application file for complete search history.

(56) References Cited

U.S. PATENT DOCUMENTS

| 6,318,206 | B1 * | 11/2001 | Kramer | F16H 63/32 |
| | | | | 74/473.36 |
| 2010/0116076 | A1 * | 5/2010 | Hoering | F16H 63/32 |
| | | | | 74/473.37 |
| 2016/0033036 | A1 * | 2/2016 | Lee | F16H 63/32 |
| | | | | 74/473.37 |

FOREIGN PATENT DOCUMENTS

| DE | 4220622 | 1/1994 |
| DE | 102013108596 | 2/2015 |

(Continued)

*Primary Examiner* — Victor L MacArthur
(74) *Attorney, Agent, or Firm* — Marshall & Melhorn, LLC

(57) ABSTRACT

An actuation assembly for use in a drive unit assembly of a vehicle. The actuation assembly includes an actuator shaft that is connected to a shift shaft and a shift fork via a lever member. At least a portion of the lever member is connected to the shift shaft and at least a portion of the lever member is pivotably connected to said actuator shaft. An actuation mechanism drives the actuator shaft linearly to pivot the lever member which in turn rotates the shift shaft and the shift fork.

16 Claims, 9 Drawing Sheets

(56) References Cited

FOREIGN PATENT DOCUMENTS

| EP | 1302706 | 4/2003 | |
|----|---------|--------|---|
| JP | H01104471 | 4/1989 | |
| WO | WO-2007057197 A1 * | 5/2007 | ........... F16D 25/088 |
| WO | WO-2018085345 A2 * | 5/2018 | .............. F16D 11/10 |

* cited by examiner

SHIFT FORK ACTUATION ASSEMBLY

CROSS-REFERENCE TO RELATED APPLICATIONS

The present application claims the benefit to U.S. Provisional Patent Application No. 62/657,006 filed on Apr. 13, 2018, which is incorporated herein by reference in its entirety.

FIELD OF THE DISCLOSURE

The present disclosure relates a shift fork and actuation assembly for use in a motor vehicle.

BACKGROUND OF THE DISCLOSURE

Various shift fork and actuation assemblies are known in the art. Conventional shift fork and actuation mechanisms are complex, unreliable, non-adjustable and require a relatively large amount of packaging space. This results in an actuation assembly that is expensive, prone to failures, heavy and aids in reducing the overall efficiency of the vehicle. Additionally, this results in an actuation assembly that is highly specialized for a particular application and is therefore needs to be re-engineered for each application.

It would therefore be advantageous to develop a shift fork and actuation assembly that is lighter, more compact, reliable and more cost efficient. Additionally, it would be advantageous to develop a shift fork and actuation assembly that is adjustable and/or modular in nature thereby allowing the shift fork and actuation mechanism to meet the requirements for a wider array of potential applications.

SUMMARY OF THE DISCLOSURE

An actuation assembly for use in a drive unit assembly of a vehicle. The actuation assembly includes an actuator shaft that is connected to a shift shaft and a shift fork via a lever member. At least a portion of the lever member is connected to the shift shaft and at least a portion of the lever member is pivotably connected to said actuator shaft. An actuation mechanism drives the actuator shaft linearly to pivot the lever member which in turn rotates the shift shaft and the shift fork.

According to an aspect of the disclosure, the actuation mechanism may be a pneumatic actuator, a hydraulic actuator and/or a linear actuator.

According to any one of the previous aspects of the disclosure, at least a portion of the actuator shaft may be axially off-set from and extend substantially transverse to or substantially perpendicular to at least a portion of the shift shaft.

According to any one of the previous aspects of the disclosure, the lever member may have a first end portion and a second end portion. At least a portion of the first end portion of the lever member may be connected to at least a portion of the shift shaft. Additionally, at least a portion of the second end portion of the lever member may be pivotably received within at least a portion of a lever member receiving portion extending inward into at least a portion of the actuator shaft.

According to any one of the previous aspects of the disclosure, at least a portion of the second end portion of the lever member may have an area of increased material thickness having a substantially circular shape.

According to any one of the previous aspects of the disclosure, the shift fork and/or the lever member may be integrally formed as part of the shift shaft or the shift fork and/or the lever may be separate components that are selectively attachable and/or detachable to and/or from each other.

According to any one of the previous aspects of the disclosure, the actuation assembly may include a sliding collar that is selectively axially movable between a first position, a second position and/or a third position.

According to any one of the previous aspects of the disclosure, the sliding collar may have one or more engagement portions that are selectively engagable with at least a portion of the shift fork.

According to any one of the previous aspects of the disclosure, the one or more engagement portions of the sliding collar may be one or more grooves that circumferentially extends along at least a portion of an outer surface of the sliding collar. The one or more grooves in the outer surface of the sliding collar may be of a size and shape needed to receive and/or retain at least a portion of the shift fork therein. The shift fork may be used in order to selectively transition the sliding collar between the first position, the second position and/or the third position.

According to any one of the previous aspects of the disclosure, the shift fork may have one or more engagement portions that are engagable with at least a portion of the one or more engagement portions of the sliding collar.

According to any one of the previous aspects of the disclosure, the one or more one or more engagement portions may be integrally formed as part of the shift fork or rotationally connected to at least a portion of the shift fork.

According to any one of the previous aspects of the disclosure, the actuation assembly may include one or more first stopper members and/or one or more second stopper members that are disposed proximate to the lever member. The one or more first and/or second stopper members may provide a positive stop thereby preventing the lever member from moving beyond a pre-determined amount. A body portion of the one or more first and/or second stopper members may have a thickness needed to selectively translate a sliding collar between a first position, a second position and/or a third position.

According to any one of the previous aspects of the disclosure, the actuation assembly may include one or more sleeve members. The one or more sleeve members may be disposed around at least a portion of the body portion of the one or more first stopper members and/or the body portion of the one or more second stopper members. The one or more sleeve members may have a thickness needed to selectively transition a sliding collar between a first position, a second position and/or a third position.

According to any one of the previous aspects of the disclosure, the one or more first and/or second stopper members may be integrally formed as part of the housing or the one or more first and/or second stopper members may be selectively attachable and/or detachable to and/or from the housing.

According to any one of the previous aspects of the disclosure, the housing may have one or more second openings providing access to the one or more first stopper members, the one or more second stopper members and/or the one or more sleeves.

According to any one of the previous aspects of the disclosure, one or more second covers may be selectively attachable and/or detachable to and/or from the housing in order to seal off and/or provide access to the one or more first stopper members, the one or more second stopper members and/or the one or more sleeves through the one or more second openings in the housing.

According to any one of the previous aspects of the disclosure, the actuation assembly may include a sensor assembly having one or more first sensor members and one or more second sensor members. At least a portion of the one or more first sensor members may be connected to at least a portion of the actuator shaft. The one or more second sensor members may be operably configured in order to sense a location of the one or more first sensor members. A control unit may be connected to the one or more second sensors and may be operably configured to determine the position of the actuator shaft and/or a sliding collar.

An actuation assembly for use in a drive unit assembly of a vehicle. The actuation assembly may include an actuator shaft having a plurality of teeth circumferentially extending along at least a portion of an outer surface thereof. A gear member may be used in order to connect at least a portion of the actuator shaft to at least a portion of a shift shaft that is connected to a shift fork. The gear member may have a plurality of teeth circumferentially extending from an outer surface thereof. At least a portion of the plurality of gear teeth of the gear member may be complementary to and meshingly engaged with at least a portion of a plurality of teeth circumferentially extending along at least a portion of an outer surface of the actuator shaft. An actuation mechanism may be operably configured to rotate or linearly translate the actuator shaft as needed to rotate the gear member which in turn rotates the shift shaft and the shift fork.

According to the previous aspect of the disclosure, the shift fork and/or the gear member may be integrally formed as part of the shift shaft.

According to any one of the previous aspects of the disclosure, at least a portion of the actuator shaft may be axially off-set from and extend substantially transverse to or substantially perpendicular to at least a portion of the shift shaft.

According to any one of the previous aspects of the disclosure, the shift fork may selectively transition a sliding collar between a first position, a second position and/or a third position.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the shift fork and actuation assembly disclosed herein may be used in automotive, off-road vehicle, all-terrain vehicle, construction, structural, marine, aerospace, locomotive, military, machinery, robotic and/or consumer product applications. Additionally, as a non-limiting example, the shift fork and actuation assembly disclosed herein may also be used in passenger vehicle, electric vehicle, hybrid vehicle, commercial vehicle, autonomous vehicles, semi-autonomous vehicles and/or heavy vehicle applications.

FIGS. 1-8 provide a schematic illustration of a drive unit assembly 2 having an actuation assembly 4 according to an embodiment of the disclosure. According to an embodiment of the disclosure and as a non-limiting example the actuation assembly 4 may be used in order to selectively transition the drive unit assembly 2 between one or more driving modes, between different gearing arrangements, between locked and unlocked differential driving modes, and/or to selectively connect and/or disconnect a shaft to and/or from the drive unit assembly 2. As a result, it is therefore within the scope of this disclosure and as a non-limiting example that the drive unit assembly 2 may be a transmission assembly, a differential assembly, an inter-axle differential assembly, a transfer case assembly, a power transfer unit assembly, a front axle assembly, a rear axle assembly, a forward tandem axle assembly and/or a rear tandem axle assembly.

Figure 1:
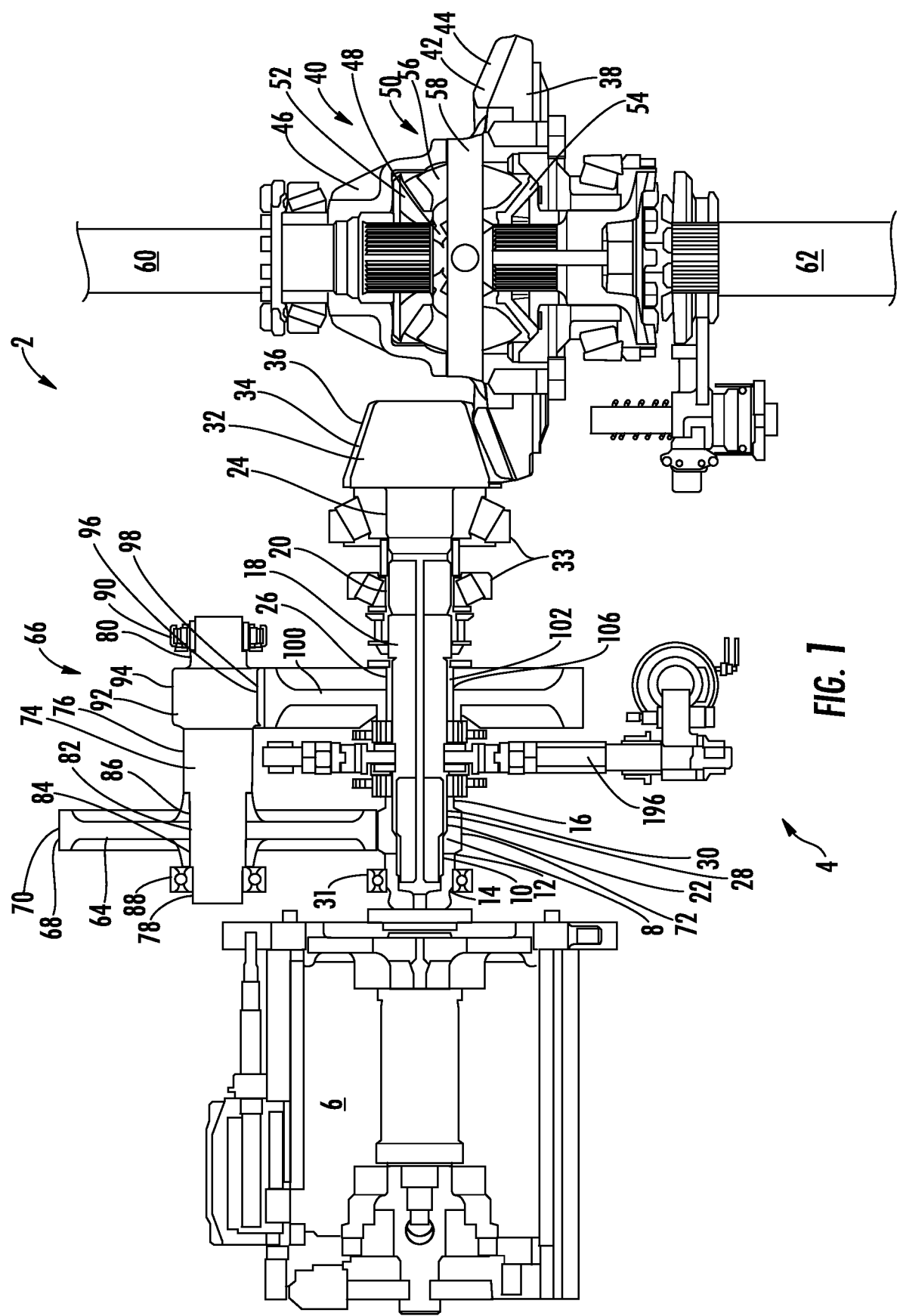
FIG. 1 is a schematic cross-sectional top-plan view of a drive unit assembly and actuation assembly according to an embodiment of the disclosure.

In accordance with the embodiment illustrated in FIG. 1 and as a non-limiting example, the drive unit assembly 2 may include a source of rotational power 6 that is drivingly connected to an end of a second shaft 8 having an inner surface 10, an outer surface 12, a first end portion 14 and a second end portion 16. As best seen in FIG. 1 of the disclosure and as a non-limiting example, at least a portion of the source of rotational power 6 may be drivingly connected to at least a portion of the first end portion 14 of the second shaft 8. It is within the scope of this disclosure and as a non-limiting example that the source of rotational power 6 may be an engine, a motor, an electric motor, a motor generator, a steam engine, a turbine engine, a heat engine, or any other type of device that is capable of converting an amount of energy into an amount of rotational or mechanical energy. As a result, it is therefore within the scope of this disclosure and as a non-limiting example that the drive unit assembly 2 may be an electric or hybrid electric drive unit assembly.

At least a portion of a first shaft 18 having an outer surface 20, a first end portion 22, a second end portion 24 and an intermediate portion 26 interposed between the first and second end portions 22 and 24 may be selectively drivingly connected to at least a portion of the second shaft 8. In accordance with the embodiment illustrated in FIGS. 1 and 2 of the disclosure and as a non-limiting example, at least a portion of the first end portion 22 of the first shaft 18 may be disposed within at least a portion of a receiving portion 28 in the second shaft 8 of the drive unit assembly 2. In order to aid in rotationally supporting the first shaft 18 within the receiving portion 28 of the second shaft 8 one or more first rotational support members 30 may be disposed between the inner surface 10 of the second shaft 8 and the outer surface 20 of the first shaft 18. It is within the scope of this disclosure and as a non-limiting example that the one or more first rotational support members 30 may be one or more bushings, one or more needle bearing assemblies, one or more cylindrical roller bearing assemblies and/or any other type of bearing assembly that may provide rotational support for the first shaft 18 within the second shaft 8. Additionally, it is within the scope of this disclosure and as a non-limiting example that the first shaft 18 may be a shaft, a pinion gear shaft, an input shaft, an inter-axle differential input shaft, a differential input shaft, a transfer case input shaft, a transmission input shaft, or a power transfer unit input shaft.

As best seen in FIG. 1 of the disclosure and as a non-limiting example, at least a portion of a pinion gear 32 may be connected to at least a portion of the second end portion 24 of the first shaft 18. The pinion gear 32 may have a plurality of pinion gear teeth 34 circumferentially extending from an outer surface 36 thereof. It is within the scope of this disclosure and as a non-limiting example that the pinion gear 32 may be integrally connected to or integrally formed as part of the second end portion 24 of the first shaft 18. In accordance with the embodiment where the pinion gear 32 is a separate component connected to the first shaft 18, at least a portion of the pinion gear 32 may be integrally connected to the first shaft 18 by using one or more mechanical fasteners, one or more welds, one or more adhesives, a threaded connection and/or a spline connection.

Additionally, as best seen in FIG. 1 of the disclosure and as a non-limiting example, at least a portion of the first end portion 22 of the first shaft 18 and the second shaft 8 may be rotationally supported by one or more first bearing assemblies 31. At least a portion of the second end portion 24 of the first shaft 18 may be rotationally supported by one or more second bearing assemblies 33. It is to be understood that at the one or more second bearing assemblies 33 of the drive unit assembly 2 may also provide rotational support for the second end portion 16 of the second shaft 8. As a non-limiting example, the one or more first and second bearing assemblies 31 and 33 may be one or more roller bearing assemblies, one or more tapered roller bearing assemblies, one or more cylindrical roller bearing assemblies, one or more angular contact ball bearing assemblies, and/or one or more multi-row bearing assemblies.

Drivingly connected to at least a portion of the pinion gear 32 of the drive unit assembly 2 is a ring gear 38 of a differential assembly 40. The ring gear 38 of the differential assembly 40 may have a plurality of ring gear teeth 42 circumferentially extending from at least a portion of an outer surface 44 thereof. The plurality of ring gear teeth 42 may be complementary to and meshingly engaged with at least a portion of the plurality of pinion gear teeth 34 of the pinion gear 32.

According to the embodiment illustrated in FIG. 1 of the disclosure and as a non-limiting example, at least a portion of the ring gear 38 may be drivingly connected to at least a portion of a differential case 46 of the differential assembly 40. The differential case 46 may have a hollow interior portion 48 having a side and shape to receive and/or retain at least a portion of a differential gear assembly 50 therein. It is within the scope of this disclosure and as a non-limiting example that at least a portion of the ring gear 38 may be integrally formed as part of the differential case 46 or integrally connected to at least a portion of the differential case 46 by using one or more mechanical fasteners, one or more adhesives, one or more welds, a threaded connection and/or a spline connection.

As best seen in FIG. 1 of the disclosure and as a non-limiting example, the differential gear assembly 50 of the differential assembly 40 may include a first side gear 52, a second side gear 54 and one or more spider gears 56. At least a portion of the first side gear 52 of the differential gear assembly 50 may be drivingly connected to at least a portion of a first axle half shaft 60. Additionally, at least a portion of the second side gear 54 may be drivingly connected to a second axle half shaft 62. The ends of the first and second axle half shafts 60 and 62 of the drive unit assembly 2 may be drivingly connected to at least a portion of a first and second wheel end assembly (not shown) respectively.

At least a portion of the one or more spider gears 56 of the differential gear assembly 50 may be rotationally supported on one or more spider shafts 58 that are connected to at least a portion of the differential case 46 of the differential assembly 40. Additionally, at least a portion of the one or more spider gears 56 may be drivingly connected to at least a portion of the first and second side gears 52 and 54 of the differential gear assembly 50. As a result, of this arrangement, the differential assembly 40 allows the first and second wheel end assemblies (not shown) to rotate a different speeds when making turns.

Disposed outboard from at least a portion of the second shaft 8 is a first gear 64 of a gear assembly 66. Circumferentially extending along at least a portion of an outer surface 68 of the first gear 64 is a plurality of first gear teeth 70. The plurality of first gear teeth 70 may be complementary to and meshingly engaged with a plurality of gear teeth 72 circumferentially extending along at least a portion of the outer surface 12 of the second shaft 8. It is within the scope of this disclosure and as a non-limiting example that the gear assembly 66 may be a reduction gear assembly providing the drive unit assembly 2 with a low speed and high torque driving mode. Additionally, it is within the scope of this disclosure and as a non-limiting example that the drive unit assembly 2 may be a multi-speed drive unit assembly. As a result, it is therefore to be understood that the drive unit assembly 2 may be a two-speed drive unit assembly.

At least a portion of a third shaft 74 having an outer surface 76, a first end portion 78 and a second end portion 80 may be drivingly connected to at least a portion of the first gear 64 of the gear assembly 66. It is within the scope of this disclosure and as a non-limiting example that the third shaft 74 may be integrally formed as part of the first gear 64 or connected to at least a portion of the first gear 64 as a separate component. According to the embodiment where the second shaft is a separate component from the first gear 64, the third shaft 74 may have a plurality of axially extending second shaft splines 82 circumferentially extending along at least a portion of the outer surface 76 of the third shaft 74. The plurality of axially extending second shaft splines 82 may be complementary top and meshingly engaged with at least a portion of a plurality of axially extending splines 84 circumferentially extending along at least a portion of an inner surface 86 of the first gear 64 of the gear assembly 66.

In order to rotationally support the third shaft 74 of the gear assembly 66, one or more third bearing assemblies 88 and/or one or more fourth bearing assemblies 90 may be used. As best seen in FIG. 1 of the disclosure and as a non-limiting example, at least a portion of the one or more third and fourth bearing assemblies 88 and 90 may be in direct contact with at least a portion of the first end portion 78 and the second end portion 80 of the third shaft 74 respectfully. As a non-limiting example, the one or more third and fourth bearing assemblies may be one or more roller bearing assemblies, one or more tapered roller bearing assemblies, one or more cylindrical roller bearing assemblies, one or more angular contact ball bearing assemblies, and/or one or more multi-row bearing assemblies.

As best seen in FIG. 1 of the disclosure and as a non-limiting example, the gear assembly 66 may include a second gear 92 having a plurality of second gear teeth 94. The second gear 92 may be integrally formed as part of the second end portion 80 of the third shaft 74 or may be connected to at least a portion of the third shaft 74 as a separate component. According to the embodiment where the second gear 92 is a separate component, the second gear 92 may be integrally connected to at least a portion of second end portion 80 of the third shaft 74 by using one or more welds, one or more mechanical fasteners, one or more adhesives, a threaded connection and/or a spline connection.

Figure 2:
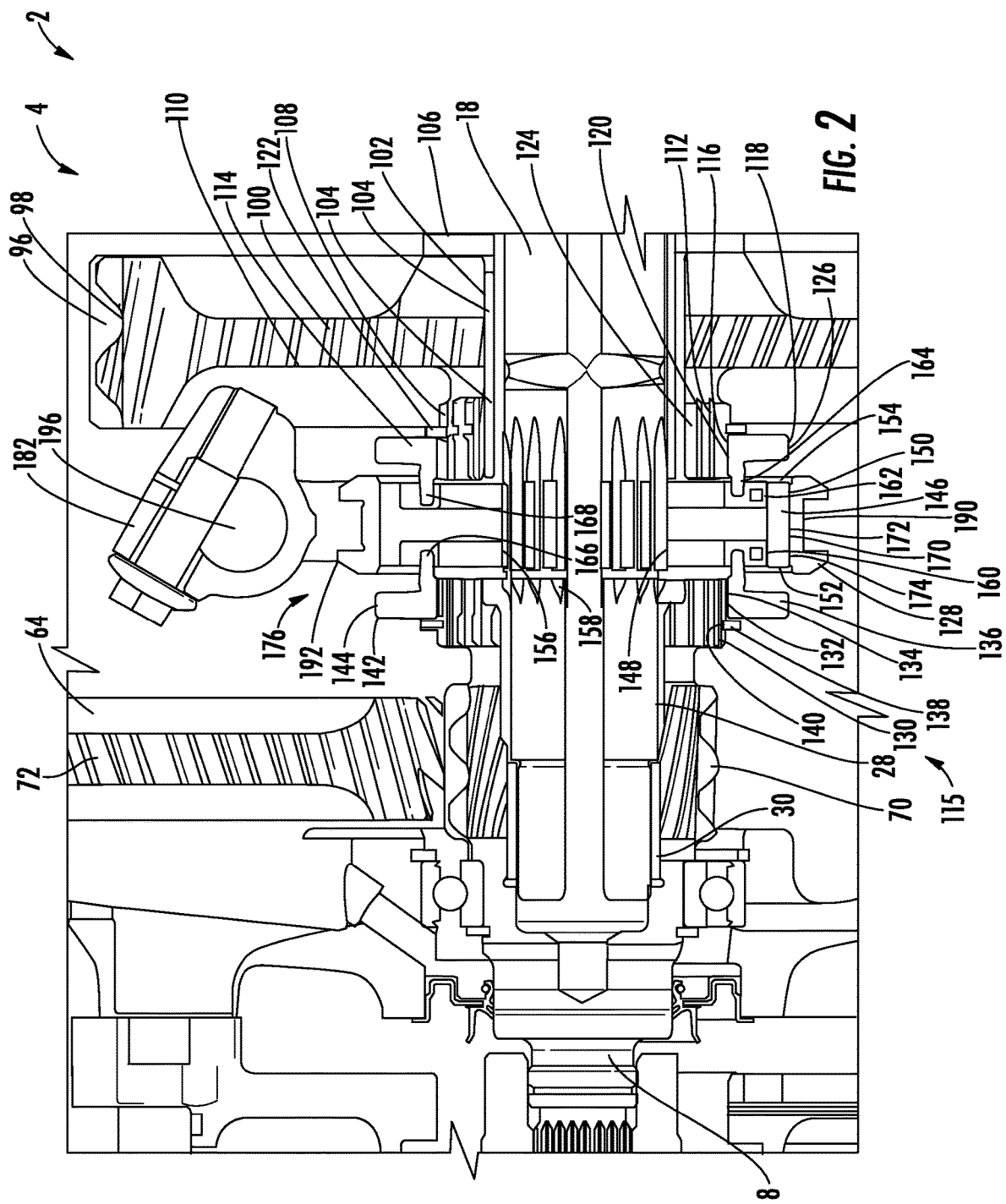
FIG. 2 is a schematic cross-sectional top-plan view of a portion of the drive unit assembly and actuation assembly illustrated in FIG. 1 of the disclosure when the actuation assembly is in a first position.

The plurality of second gear teeth 94 of the second gear 92 may be complementary to and meshingly engaged with at least a portion of a plurality of third gear teeth 96 circumferentially extending along at least a portion of an outer surface 98 of a third gear 100. As illustrated in FIGS. 1 and 2 of the disclosure and as a non-limiting example, the third gear 100 of the gear assembly 66 may have a hollow portion 102 therein having a size and shape to receive at least a portion of the first shaft 18 of the drive unit assembly 2. In order to provide rotational support for the third gear 100 on the first shaft 18, one or more second rotational support members 104 may be interposed between the outer surface 20 of the first shaft 18 and an inner surface 106 of the third gear 100 defining the hollow portion 102. It is within the scope of this disclosure and as a non-limiting example that the one or more second rotational support members 104 may be one or more bushings, one or more needle bearing assemblies, one or more cylindrical roller bearing assemblies and/or any other type of bearing assembly that may provide rotational support for the third gear 100.

The third gear 100 may include one or more axially extending portions 108 extending axially outward away from at least a portion of a first side 110 of the third gear 100. Circumferentially extending along at least a portion of the outer surface 98 of the one or more axially extending portions 108 of the third gear is a plurality of axially extending third gear splines 112.

At least a portion of a first collar member 114 of a clutch assembly 115 of the drive unit assembly 2 may be disposed radially outboard from at least a portion of the one or more axially extending portions 108 of the third gear 100. As best seen in FIG. 2 of the disclosure and as a non-limiting example, the first collar member 114 may have an inner surface 116 and an outer surface 118 The inner surface 116 of the first collar member 114 may have a first plurality of axially extending first collar member splines 120 circumferentially extending along at least a portion thereof. The first plurality of axially extending first collar member splines 120 may be complementary to and meshingly engaged with at least a portion of the plurality of axially extending third gear splines 112 on the one or more axially extending portions 108 of the third gear 100.

In order to axially restrain the first collar member 114 relative to the one or more axially extending portion 108 of the third gear 100 one or more first retaining members 122 may be used. At least a portion of the one or more first retaining members 122 may be received and/or retained within at least a portion of one or more grooves 124 circumferentially extending along at least a portion of the outer surface 98 of the one or more axially extending portions 108 of the third gear 100. According to the embodiment illustrated in FIG. 2 of the disclosure and as a non-limiting example, at least a portion of the one or more grooves 124 may be disposed within the plurality of axially extending third gear splines 112 on the one or more axially extending portions 108 of the third gear 100 of the gear assembly 66.

While the first collar member 114 of the clutch assembly 115 illustrated in FIG. 2 is a separate component from the third gear 110, it is within the scope of this disclosure and as a non-limiting example that the first collar member 114 may be integrally formed as part of the one or more axially extending portions 108 of the third gear 100 of the drive unit assembly 2.

Circumferentially extending from at least a portion of the outer surface 118 of the first collar member 114 is a second plurality of axially extending first collar splines 126. The second plurality of axially extending first collar splines 126 on the outer surface 118 of the first collar member 114 may be selectively engagable with at least a portion of a sliding collar 128 of the clutch assembly 115.

The second shaft 8 may include a plurality of axially extending splines 130 circumferentially extending along at least a portion of the outer surface 12 of the second end portion 16 of the second shaft 8 of the drive unit assembly 2. The plurality of axially extending splines 130 may be complementary to and meshingly engaged with at least a portion of a first plurality of axially extending second collar member splines 132 circumferentially extending along at least a portion of an inner surface 134 of a second collar member 136 of the clutch assembly 115.

In order to axially restrain the second collar member 136 relative to the second shaft 8, one or more second retaining members 138 may be used. At least a portion of the one or more second retaining members 138 may be received and/or retained within at least a portion of one or more grooves 140 circumferentially extending along at least a portion of the outer surface 12 of second end portion 16 of the second shaft 8. According to the embodiment illustrated in FIG. 2 of the disclosure and as a non-limiting example, at least a portion of the one or more grooves 140 may be disposed within the plurality of axially extending splines 130 on the outer surface 12 of the second shaft 8.

While the second collar member 136 of the clutch assembly 115 illustrated in FIG. 2 is a separate component from the second shaft 8, it is within the scope of this disclosure and as a non-limiting example that the second collar member 136 may be integrally formed as part of the second end portion 16 of the second shaft 8 of the drive unit assembly 2.

Circumferentially extending from at least a portion of an outer surface 142 of the second collar member 136 is a second plurality of axially extending second collar splines 144. The second plurality of axially extending second collar splines 144 on the outer surface 142 of the second collar member 136 may be are selectively engagable with at least a portion of the sliding collar 128 of the clutch assembly 115.

At least a portion of a hub member 146 having an inner surface 148, an outer surface 150, a first side 152 and a second side 154 may be disposed radially outboard from and drivingly connected to at least a portion of the first shaft 18 of the drive unit assembly 2. As best seen in FIG. 2 of the disclosure and as a non-limiting example, the hub member 146 may have a first plurality of axially extending hub member splines 156 circumferentially extending along at least a portion of the inner surface 148 thereof. The first plurality of axially extending hub member splines 156 of the hub member 146 may be complementary to and meshingly engaged with at least a portion of a second plurality of axially extending first shaft splines 158 circumferentially extending along at least a portion of the outer surface 20 of the intermediate portion 26 of the first shaft 18.

While the hub member 146 illustrated in FIG. 2 is a separate component from the first shaft 18, it is within the scope of this disclosure and as a non-limiting example that the hub member 146 may be integrally formed as part of the intermediate portion 26 of the first shaft 18 of the drive unit assembly 2.

According to the embodiment illustrated in FIG. 2 of the disclosure and as a non-limiting example, the hub member 146 of the gear assembly 66 may include one or more first receiving portions 160 and/or one or more second receiving portions 162 extending inward from at least a portion of the first side 152 and/or the second side 154 of the hub member 146 respectively. The one or more first and second receiving portions 160 and 162 may be of a size and shape to receive and/or retain at least a portion of one or more axially extending portions 164 and 166 extending from at least a portion of an end of the first and second collar members 114 and 136 of the clutch assembly 115. As a result, it is therefore to be understood that the one or more axially extending portions 164 and 166 of the first and second collar members 114 and 136 may extend toward the hub member 146 of the gear assembly 66.

In accordance with the embodiment illustrated in FIG. 2 of the disclosure and as a non-limiting example, the clutch assembly 115 may include one or more synchronizing members 168 disposed within at least a portion of the one or more first and/or second receiving portions 160 and/or 162 in the hub member 146. The one or more synchronizing members 168 may be selectively engagable with at least a portion of the hub member 146, the first collar member 114 and/or the second collar member 136 of the clutch assembly 115. According to the embodiment illustrated in FIG. 2 and as a non-limiting example, the one or more synchronizing members 168 may be selectively engagable with at least a portion of the hub member 146, the one or more axially extending portions 164 of the first collar member 114 and/or the one or more axially extending portions 166 of the second collar member 136. It is within the scope of this disclosure and as a non-limiting example that the one or more synchronizing members 168 may be used in order to aid ensuring that the hub member 146 and the sliding collar 128 are rotating at relatively the same speed as the first collar member 114 and/or the second collar member 136. This aids in improving the overall life and durability of the clutch assembly 115 by minimizing and/or eliminating the amount of time that the sliding collar 128 is in a blocked condition and therefore unable to transition between driving modes.

The sliding collar 128 of the clutch assembly 115 may be drivingly connected to and slidingly engaged with at least a portion of the hub member 146 of the gear assembly 66. As best seen in FIG. 2 of the disclosure and as a non-limiting example, the sliding collar 128 may include a plurality of axially extending sliding collar splines 170 circumferentially extending along at least a portion of an inner surface 172 thereof. The plurality of axially extending sliding collar splines 170 may be complementary to a second plurality of axially extending hub member splines 174 circumferentially extending along at least a portion of the outer surface 150 of the hub member 146. Additionally, the plurality of axially extending sliding collar splines 170 of the sliding collar 128 may be complementary to and selectively engagable with the second plurality of axially extending first collar splines 126 of the first collar member 114 and the second plurality of axially extending second collar splines 144 of the second collar member 136.

When the sliding collar 128 is in the first position 176 illustrated in FIG. 2 of the disclosure, the source of rotational power 6 is drivingly disconnected from the differential assembly 40 of the drive unit assembly 2. As a result, it is within the scope of this disclosure and as a non-limiting example that when the clutch assembly 115 is in the first position 176 illustrated in FIG. 2, the drive unit assembly 2 in is a neutral position and the clutch assembly 115 acts like a disconnect.

Figure 4:
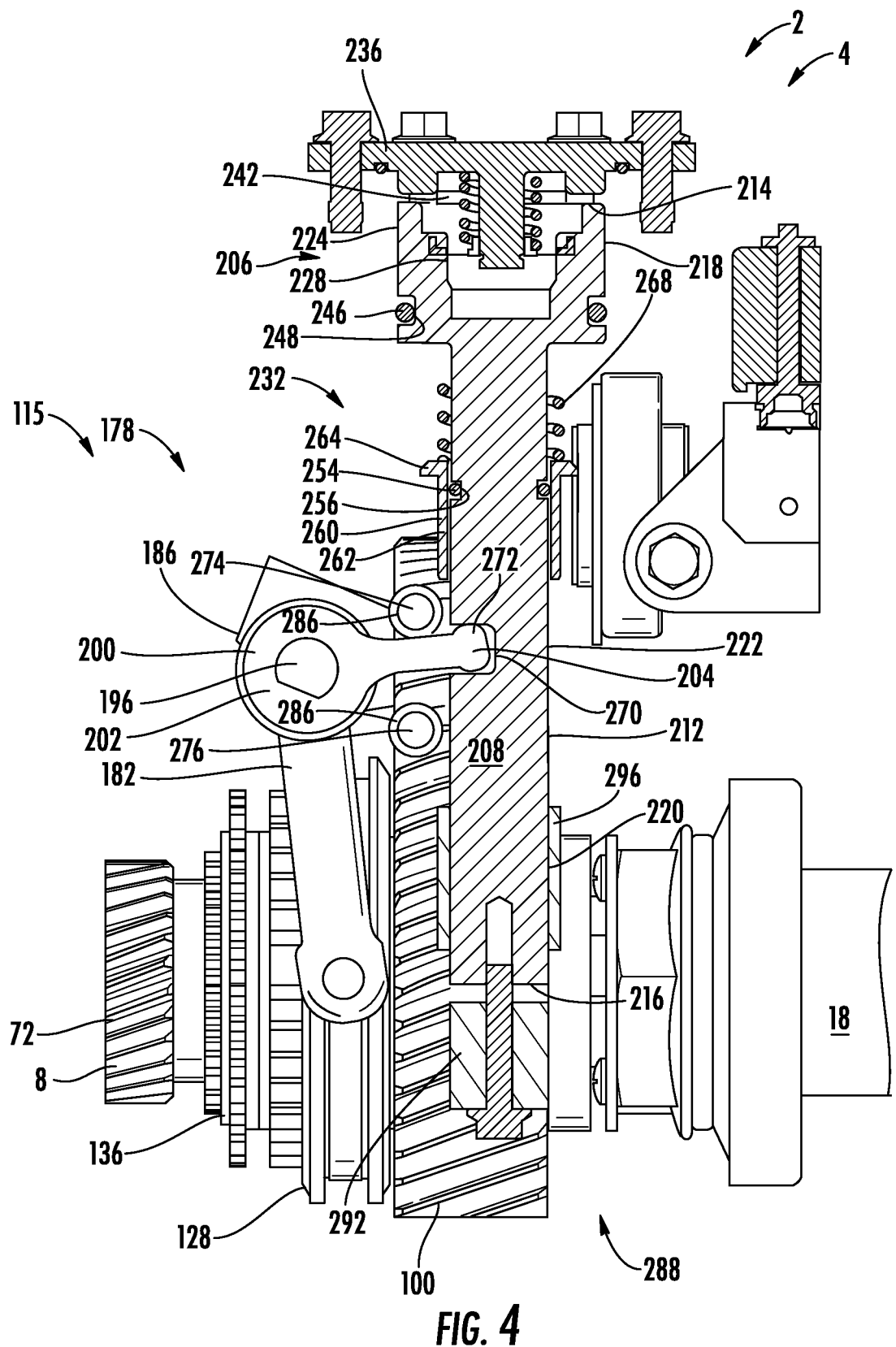
FIG. 4 is a schematic partial cut-away view of a portion of the drive unit assembly and the actuation assembly illustrated in FIGS. 1-3 of the disclosure when the actuation assembly is in a second position.

When the sliding collar 128 is in the second position 178 illustrated in FIG. 4, at least a portion of the plurality of axially extending sliding collar splines 170 may be meshingly engaged with at least a portion of the second plurality of axially extending hub member splines 174 of the hub member 146 and the second plurality of axially extending first collar splines 126 of the first collar member 114. As a result, the source of rotational power 6 may be drivingly connected to the first shaft 18 via the meshing engagement between plurality of gear teeth 72 of the second shaft 8, the first gear 64, the second gear 92, the third gear 100, the first collar member 114, the sliding collar 128 and/or the hub member 146. It is within the scope of this disclosure and as a non-limiting example that when the clutch assembly 115 is in the second position 178 illustrated in FIG. 4 the drive unit assembly 2 may be in a low speed high torque driving mode.

Figure 5:
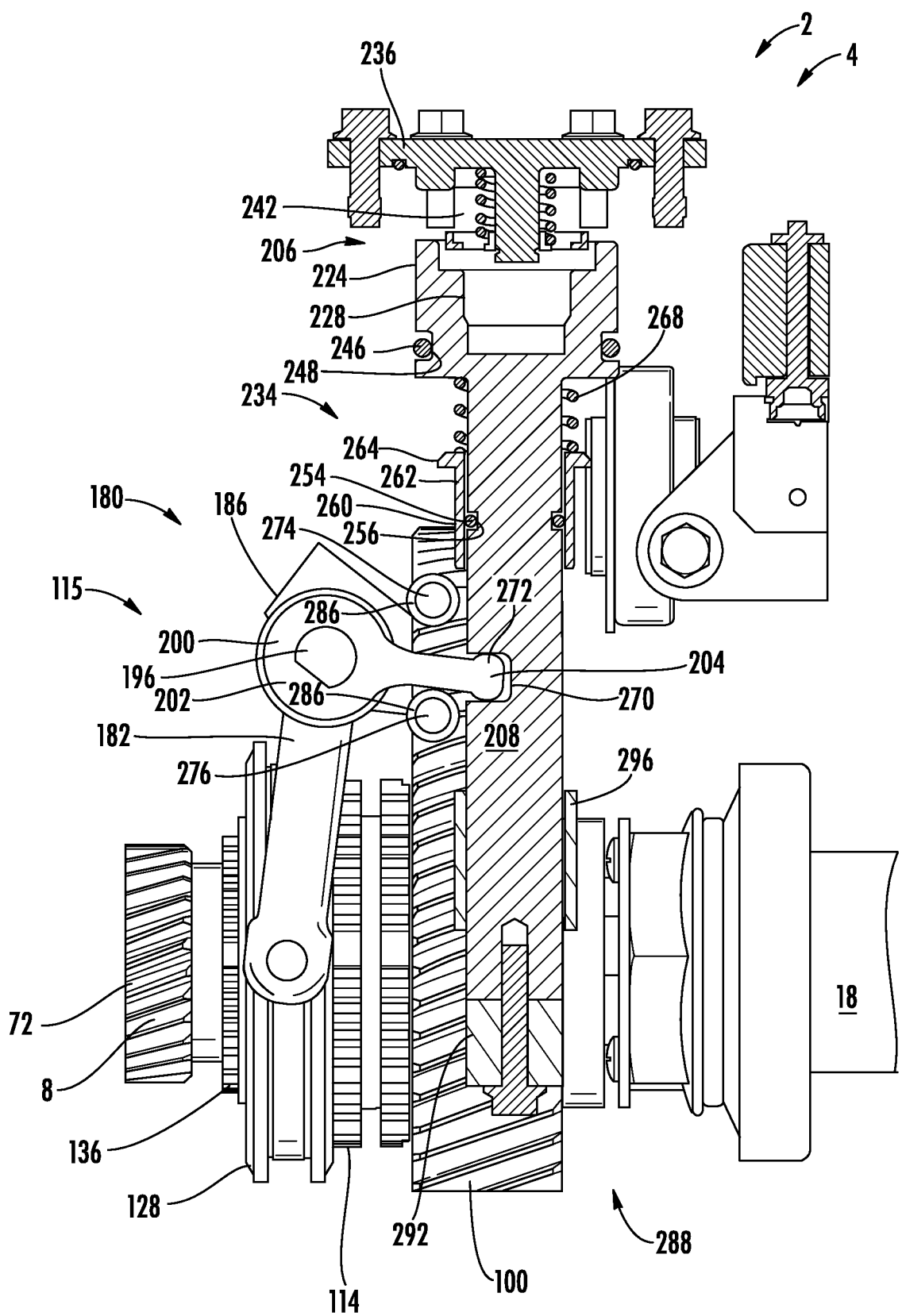
FIG. 5 is a schematic partial cut-away view of a portion of the drive unit assembly and the actuation assembly illustrated in FIGS. 1-4 of the disclosure when the actuation assembly is in a third position.

When the sliding collar is in the third position 180 illustrated in FIG. 5 of the disclosure, at least a portion of the plurality of axially extending sliding collar splines 170 may be meshingly engaged with at least a portion of the second plurality of axially extending hub member splines 174 of the hub member 146 and the second plurality of axially extending second collar splines 144 of the second collar member 136. As a result, the source of rotational power 6 may be directly drivingly connected to the first shaft 18 via the meshing engagement between the plurality of axially extending splines 130 of the second shaft 8, the second sliding collar 136, the sliding collar 128 and/or the hub member 146 of the drive unit assembly 2. It is within the scope of this disclosure and as a non-limiting example that when the clutch assembly 115 is in the third position 180 illustrated in FIG. 5 the drive unit assembly 2 may be in a high speed low torque driving mode.

Figure 3:
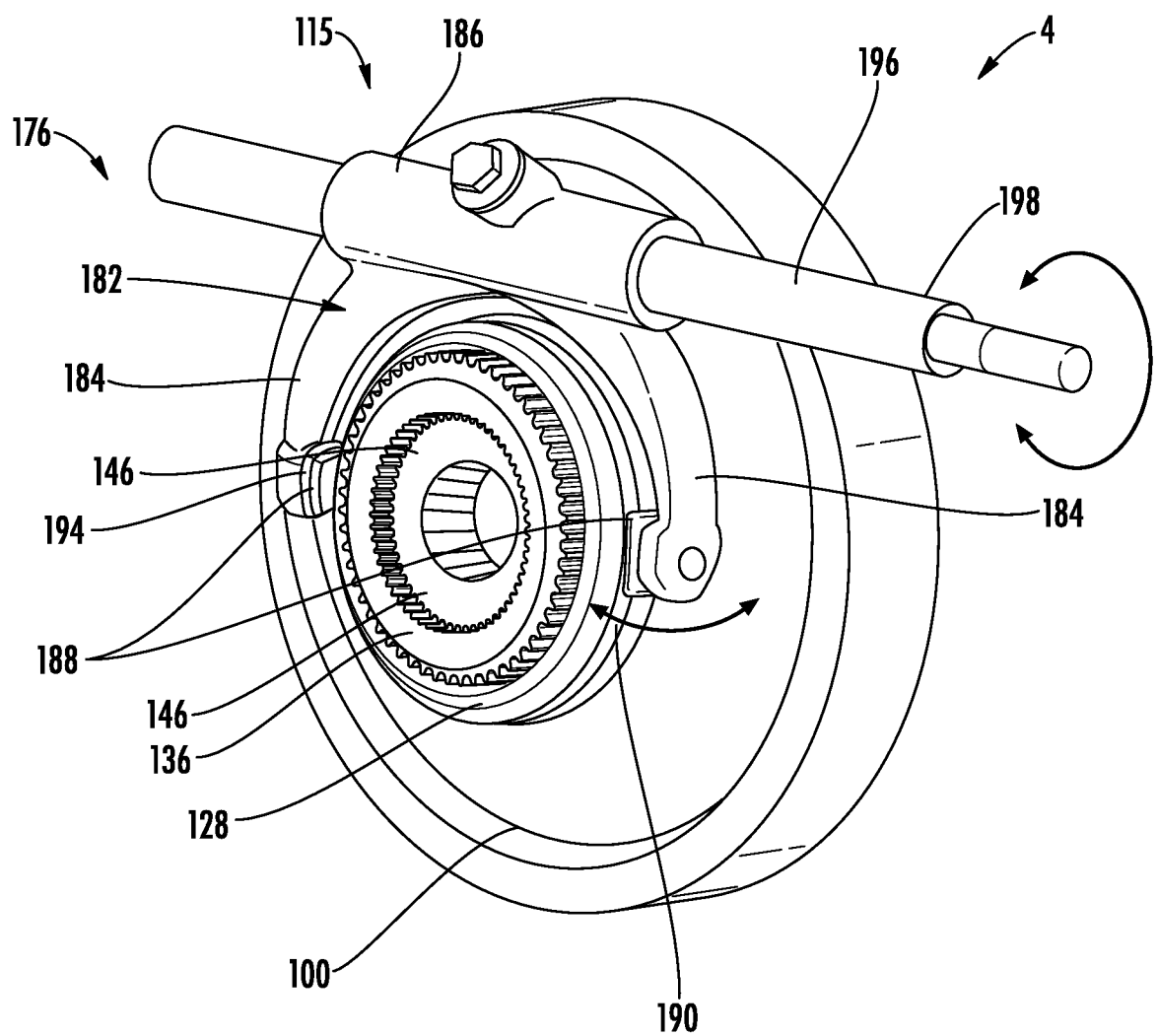
FIG. 3 is a schematic perspective view of a portion of the drive unit assembly and the actuation assembly illustrated in FIGS. 1 and 2 of the disclosure.

In order to selectively transition the clutch assembly 115 between the first position 176, the second position 178 and the third position 180 illustrated in FIGS. 2-5, the actuation assembly 4 may be used. As best seen in FIGS. 3-5 of the disclosure and as a non-limiting example, the actuation assembly 4 may include a shift fork 182 having a body portion 186 with one or more arms 184 extending toward the sliding collar 128 of the clutch assembly 115. The shift fork 182 of the actuation assembly 4 may include one or more engagement portions 188 extending from an end of the shift fork 182 opposite the body portion 186. The one or more engagement portions 188 of the shift fork 182 may be selectively engagable with one or more engagement portions 190 of the sliding collar 128. The meshing engagement between the one or more engagement portions 190 of the sliding collar 128 and the one or more engagement portions 188 of the shift fork 182 aid in selectively transitioning the sliding collar between the first, second and/or third positions 176, 178 and/or 180 illustrated in FIGS. 3-5 of the disclosure.

According to the embodiment illustrated in FIGS. 3-5 of the disclosure and as a non-limiting example, the one or more engagement portions 190 of the sliding collar 128 may be one or more grooves. The one or more grooves may circumferentially extend along at least a portion of the outer surface of the sliding collar 128. It is within the scope of this disclosure and as a non-limiting example that the one or more grooves may be of a size and shape to receive and/or retain at least a portion of the one or more engagement portions 188 of the shift fork 182.

It is within the scope of this disclosure and as a non-limiting example that the one or more engagement portions 188 may be integrally forms as part of the shift fork 182 or may be connected to at least a portion of the shift fork 182 as a separate component. According to the embodiment where the one or more engaging portions 188 are a separate component from the shift fork 182, at least a portion of the one or more engagement portions 188 may be rotationally and/or integrally connected to the end of the one or more arms 184 opposite the body portion 186 of the shift fork 182. By allowing the one or more engagement portions 188 to be rotationally connected to the shift fork 182, it allows the shift fork 182 to rotate while ensuring that the one or more engagement portions 188 are securely engaged with the one or more engagement portions 190 of the sliding collar 128. As a result, this ensures that the one or more engagement portions 188 continuously engage the one or more engagement portions 190 of the sliding collar 128 at all times when the actuation assembly 4 is in operation.

While the embodiment illustrated in FIGS. 3-5 illustrates a shift fork 182 having one or more engagement portions 188 that are received and/or retained within a groove in the sliding collar 128, it is within the scope of this disclosure that the reverse relationship may be utilized. In accordance with this embodiment of the disclosure (not shown), the sliding collar 128 may include one or more increased diameter portions (not shown) circumferentially extending from at least a portion of an outer surface of the sliding collar 128. At least a portion of the one or more increased diameter portions (not shown) may be received and/or retained within one or more grooves (not shown) in the one or more engagement portions 188 of the shift fork 182. As a result of this mating relationship, the shift fork 182 may be able to selectively transition the sliding collar between the first, second and/or third positions 176, 178 and/or 180.

As best seen in FIG. 3 of the disclosure and as a non-limiting example, the one or more engagement portions 188 may be connected to the one or more arms 184 of the shift fork 182 by one or more mounting portions 194. At least a portion of the one or more mounting portions 194 may be integrally connected to at least a portion of the end of the one or more legs 184 of the shift fork 182 and at least a portion of the one or more engagement portions 188 may be rotationally connected to at least a portion of the one or more mounting portions 194. By providing the shift fork 182 with one or more engagement portions 188 that are rotationally connected to the shift fork 182, it allows the actuation assembly 4 to be repaired and/or replaced in a quicker, easier and more cost efficient manner. This is achieved by allowing the one or more engagement portions 188 of the shift fork 182 to be repaired and/or replaced individually as needed.

At least a portion of the body portion 186 of the shift fork 182 may be connected to at least a portion of a shift shaft 196. As best seen in FIG. 1 of the disclosure and as a non-limiting example, the shift shaft 196 of the actuation assembly 4 may be off-set from and extend substantially transverse to the first shaft 18 and/or the second shaft 8 of the drive unit assembly 2. It is within the scope of this disclosure and as a non-limiting example that the shift fork 182 may be integrally formed as part of the shift shaft 196 or integrally connected to at least a portion of the shift shaft 196 as a separate component. In accordance with the embodiment where the shift fork 182 and the shift shaft 196 are separate components, the shift fork 182 may be integrally connected to at least a portion of the shift shaft 196 by using one or more welds, one or more mechanical fasteners, one or more adhesives, a threaded connection, a spline connection and/or a keyed connection.

Figure 6:
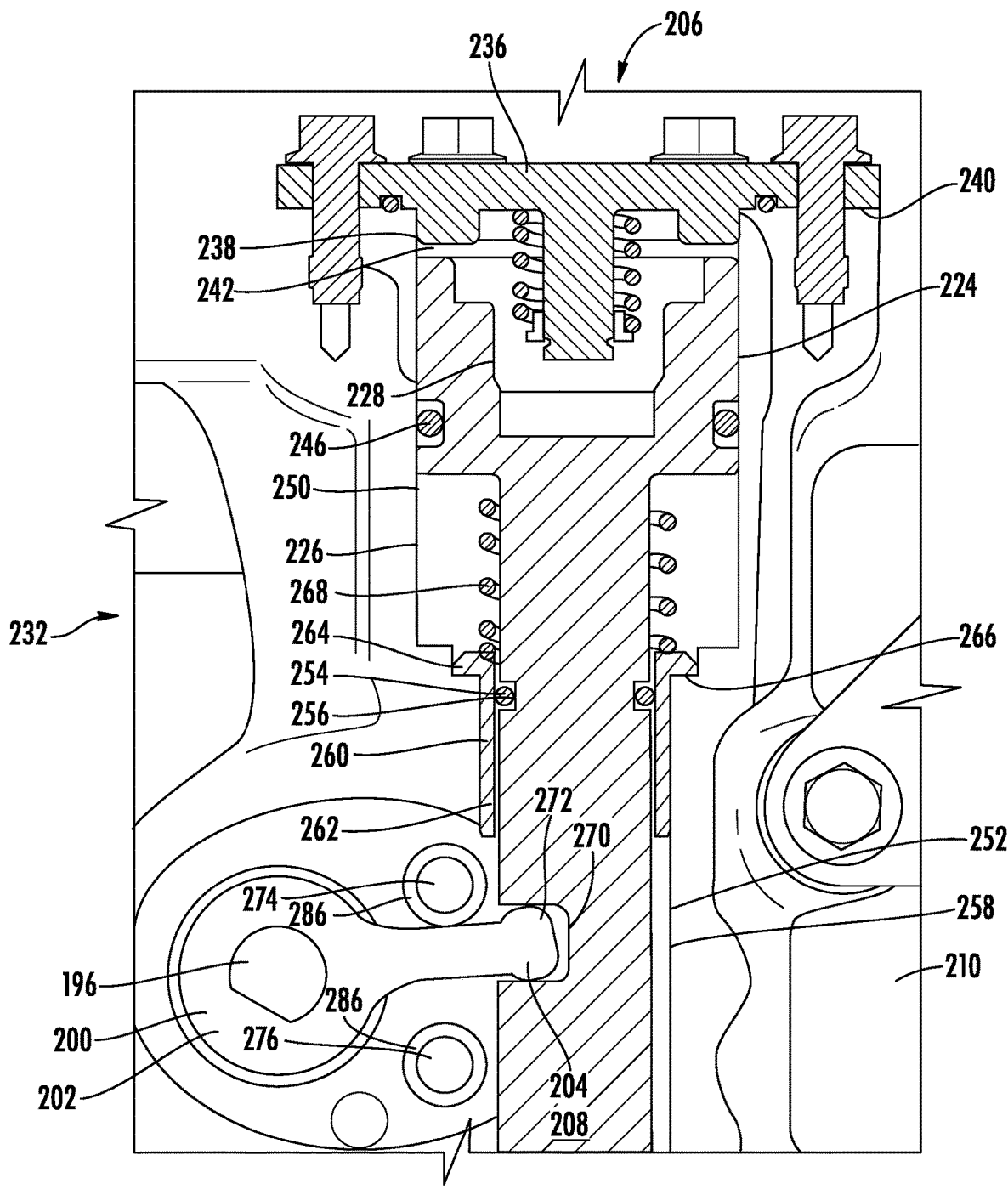
FIG. 6 is a schematic partial cut-away view of a portion of the actuation assembly illustrated in FIGS. 1-5 of the disclosure.

Connected to at least a portion of the shift shaft 196 is a lever member 200 having a first end portion 202 and a second end portion 204. As best seen in FIGS. 4-6 of the disclosure and as a non-limiting example, at least a portion of the first end portion 202 of the lever member 200 may be connected to at least a portion of a first end portion 198 of the shift shaft 196 of the actuation assembly 4. The lever member 200 of the actuation assembly 4 aids in providing the shift fork 196 with the rotational force needed to rotate the shift fork 182 and selectively transition the sliding collar 128 between the first, second and third positions 176, 178 and 180. It is within the scope of this disclosure and as a non-limiting example that the lever portion 200 may be integrally formed as part of the shift shaft 196 or integrally connected to at least a portion of the shift fork 196. According to the embodiment where the lever member 200 is a separate component from the shift shaft 196, at least a portion of the of the lever member 200 may be integrally connected to the shift shaft 196 by using one or more welds, one or more mechanical fasteners, one or more adhesives, a threaded connection, a spline connection and/or a keyed connection.

As best seen in FIGS. 4-6 of the disclosure and as a non-limiting example, the actuation assembly 4 may include an actuation mechanism 206 that is drivingly connected to at least a portion of an actuator shaft 208. In accordance with the embodiment illustrated in FIG. 6 of the disclosure and as a non-limiting example, at least a portion of the actuation mechanism 206 and/or the actuator shaft 208 may be housed within at least a portion of a housing 210 of the drive unit assembly 2. At least a portion of the actuator shaft 280 of the actuation assembly 4 may be axially off-set from the shift shaft 196 and may extend substantially transverse or substantially perpendicular to at least a portion of the shift shaft 196. A plane extending through the length of said actuator shaft 208 may extend substantially transverse to or substantially perpendicular to a plane extending through the length of the shift shaft 196 of the actuator assembly 4. As a result of this arrangement, the actuation assembly 4 is able to be more compact and is therefore able to be utilized in a wider range of applications. It is within the scope of this disclosure and as anon-limiting example that the actuation mechanism 206 may be a hydraulic actuation mechanism, a pneumatic actuation mechanism, linear actuation mechanism, a ball and ramp actuation mechanism, a linear motor and/or a motor and gear assembly type actuation assembly.

In accordance with the embodiment illustrated in FIG. 4 of the disclosure and as a non-limiting example, the actuator shaft 208 may have an outer surface 212, a first end 214, a second end 216, a first end portion 218, a second end portion 220 and an intermediate portion 222 interposed between the first and second end portions 218 and 220 of the actuator shaft 208. As best seen in FIGS. 4-6 of the disclosure and as a non-limiting example, the first end portion 218 of the actuator shaft 208 may include an increased diameter portion 224. At least a portion of the increased diameter portion 224 of the actuator shaft 208 may be received and/or retained within at least a portion of one or more first actuator shaft receiving portions 226 in the housing 210 of the drive unit assembly 2. The one or more first actuator shaft receiving portions 226 in the housing 210 may be operably configured to receive an amount of fluid (not shown) needed to selectively transition the actuation shaft 208 between the first, second and third positions 230, 232, and 234 illustrated in FIGS. 4-8 of the disclosure.

One or more receiving portions 228 may extend inward from at least a portion of the first end 214 of the actuator shaft 208 of the actuation assembly 4. The one or more receiving portions 228 may be of a size and shape to receive and/or retain at least a portion of the actuation mechanism 206 therein. In accordance with the embodiment illustrated in FIGS. 4-6 of the disclosure and as a non-limiting example, the actuation mechanism may be a pneumatic or a hydraulic actuation assembly. As a result, it is therefore to be understood that the one or more receiving portions 228 in the actuator shaft 208 may capable of receiving and/or retaining an amount of fluid therein needed in order to selectively drive the actuation shaft 208 between the first position 230 illustrated in FIGS. 7 and 8, the second position 232 illustrated in FIGS. 4 and 6, and the third position 234 illustrated in FIG. 5.

At least a portion of a first cover 236 may be disposed outward from and adjacent to at least a portion of the first end 214 of the actuator shaft 208 of the actuation assembly 4. As best seen in FIG. 6 of the disclosure and as a non-limiting example, the first cover 236 may be used in order to selectively seal off a first opening 238 in the housing 210 that provides access to the one or more first actuator shaft receiving portions 226 in the housing 210 of the drive unit assembly 2. When the first cover 236 is sealingly engaged with an outer surface 240 of the housing 210, at least a portion of the first cover 236 may form a portion of a chamber 242 that receives an amount of fluid (not shown) needed to selectively transition the actuation shaft 208 between the first, second and third positions 230, 232 and 234. When the first cover 236 is removed and not sealingly engaged with the housing 210, it provides access to at least a portion of the actuation assembly 4 as needed to repair and/or replace one or more components of the actuation assembly 4. It is within the scope of this disclosure and as a non-limiting example that the first cover 236 may be attached to at least a portion of the housing 210 by using one or more mechanical fasteners, one or more welds, one or more adhesives, a spline connection and/or a threaded connection.

In order to prevent an amount of fluid (not shown) from escaping from the chamber 242 and/or the one or more receiving portions 228 of the actuation mechanism 206, one or more first sealing members 246 may be used. The one or more first sealing members 246 may be received and/or retained within at least a portion of one or more first sealing member grooves 248 circumferentially extending along at least a portion of the outer surface 212 of the first end portion 218 and/or the increased diameter portion 224 of the actuator shaft 208. As a result, at least a portion of the one or more first sealing members 246 may be sealingly engaged with at least a portion of a surface 250 defining the one or more first actuator shaft receiving portions 226 and the outer surface 212 of the actuator shaft 208. It is within the scope of this disclosure and as a non-limiting example that the one or more first sealing members 246 may be one or more O-rings, one or more lip seals, one or more V-seals, one or more square seals, or any other type of sealing device capable of preventing an amount of fluid from exiting the chamber 242 and/or the one or more receiving portions 228.

According to the embodiment illustrated in FIG. 6 of the disclosure and as a non-limiting example, the one or more first actuator shaft receiving portions 226 may be in fluid communication with and/or may extend co-axially with at least a portion of one or more second actuator shaft receiving portions 252 disposed within the housing 210 of the drive unit assembly 2. The one or more second actuator shaft receiving portions 252 may be of a size and shape to receive and/or retain at least a portion of the intermediate portion 222 and/or the second end portion 220 of the actuator shaft 208 of the actuation assembly 4.

In order to prevent an amount of fluid (not shown) from escaping the one or more first actuator shaft receiving portions 226, one or more second sealing members 254 may be used. The one or more second sealing members 254 may be received and/or retained within at least a portion of one or more second sealing member grooves 256 circumferentially extending along at least a portion of the outer surface 212 of the intermediate portion 222 of the actuator shaft 208. As a result, at least a portion of the one or more second sealing members 254 may be sealingly engaged with at least a portion of a surface 258 defining the one or more second actuator shaft receiving portions 252 and the outer surface 212 of the actuator shaft 208. It is within the scope of this disclosure and as a non-limiting example that the one or more second sealing members 254 may be one or more O-rings, one or more lip seals, one or more V-seals, one or more square seals, or any other type of device capable of escaping one or more first actuator shaft receiving portions 226 in the housing 210.

As best seen in FIGS. 4-6 of the disclosure and as a non-limiting example, the actuation assembly 4 may include the use of one or more third sealing members 260 interposed between the outer surface 212 of the actuator shaft 208 and the surface 258 defining the one or more second actuator shaft receiving portions 252 in the housing 210. The one or more third sealing members 260 may be used in order to aid in ensuring that little to no fluid (not shown) escapes from the one or more first actuator shaft receiving portions 226 and through the one or more second actuator shaft receiving portions 252. It is within the scope of this disclosure and as a non-limiting example that the one or more third sealing members 260 may be used in order to aid in allowing the actuator shaft 208 to selectively translate between the first, second and third positions 230, 232 and 234 within the one or more first and second actuator shaft receiving portions 226 and 252 in the housing 210.

The one or more third sealing members 260 of the actuation assembly 4 may include a body portion 262 having one or more lip portions 264. As best seen in FIGS. 4-6 of the disclosure and as a non-limiting example, the one or more lip portions 264 of the one or more third sealing members 260 may be used in order to properly position the one or more third sealing members 260 relative to the one or more second sealing members 254. It is within the scope of this disclosure and as a non-limiting example that at least a portion of the one or more lip portions 264 of the one or more third sealing members 260 may be received and/or retained within at least a portion of a stepped portion 266 connecting the one or more first and second actuator shaft receiving portions 226 and 252 in the housing 210. As a non-limiting example, the at least a portion of the one or more third sealing members 260 may be press-fit within the stepped portion 266 and/or the one or more second actuator shaft receiving portions 252 in the housing 210 of the drive unit assembly 2.

One or more first biasing members 269 and/or one or more second biasing members 268 may be used in order to aid the actuator fork 208 to selectively transition between the first, second and/or third positions 230, 232, and/or 234 illustrated in FIGS. 4-8 of the disclosure. As best seen in FIGS. 4-6 and as a non-limiting example, at least a portion of the one or more first biasing members 269 may be received and/or retained within at least a portion of the one or more receiving portions 228 and/or the chamber 242 of the actuation mechanism 206 of the actuation assembly 4. The one or more first biasing members 269 may be operably configured in order to aid in transitioning the sliding collar 128 and/or the actuator shaft 208 to their first positions 176 and 230 respectively when in operation. It is within the scope of this disclosure and as a non-limiting example that at least a portion of the one or more first biasing members 269 may be connected to at least a portion of the first cover 236 and/or the actuator shaft 208. As a non-limiting example that the one or more biasing members 268 may be one or more springs.

In accordance with the embodiment illustrated in FIGS. 4-6 of the disclosure and as a non-limiting example, at least a portion of the one or more biasing members 268 may be interposed between the one or more third sealing members 260 and the increased diameter portion 224 of the actuator shaft 208. The one or more second biasing members 268 may be operably configured in order to aid in transitioning the sliding collar 128 and/or the actuator shaft 208 to their first positions 176 and 230 respectively when in operation. As a non-limiting example that the one or more biasing members 268 may be one or more springs.

Figure 7:
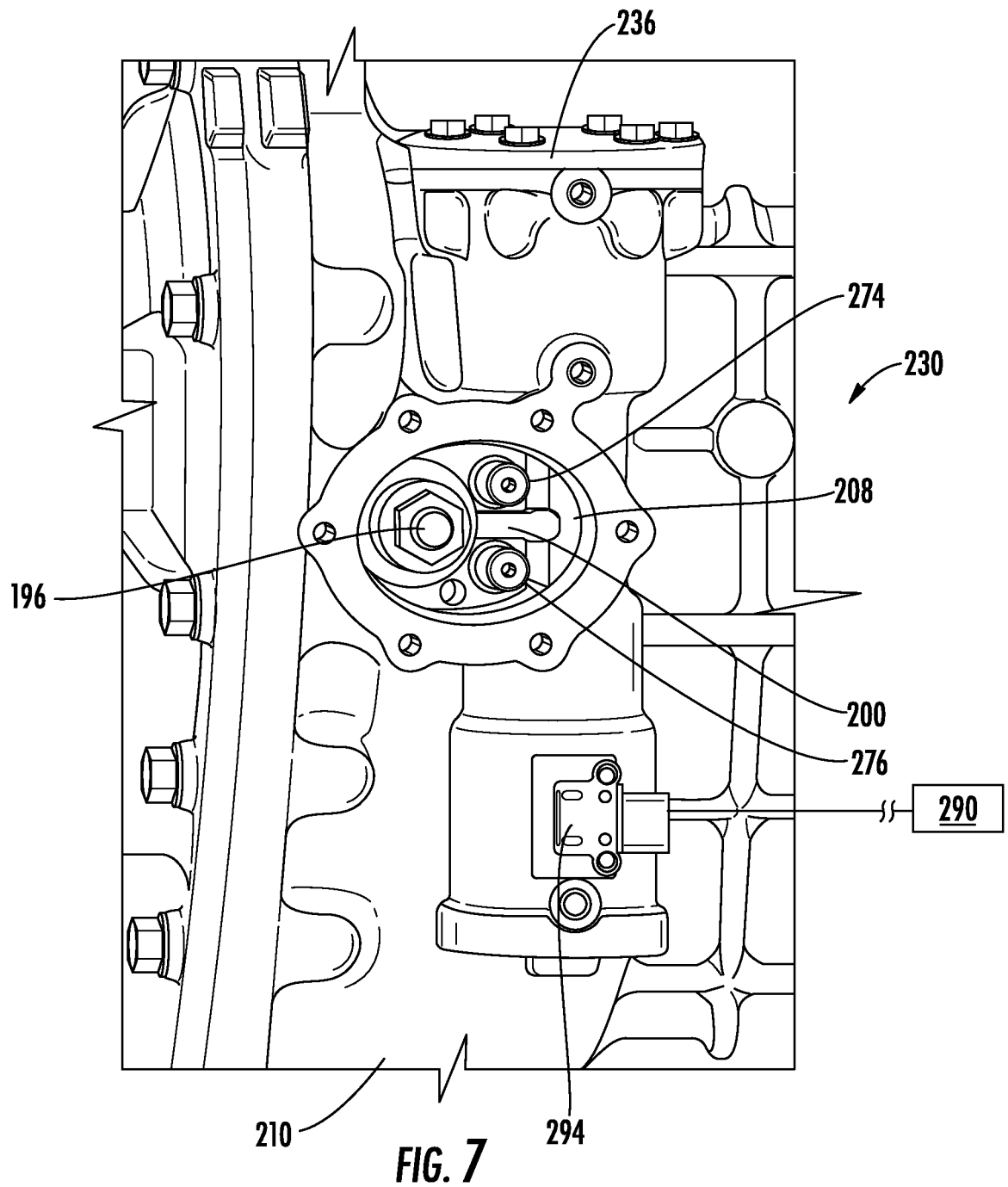
FIG. 7 is a schematic perspective view of a portion of the drive unit assembly and the actuation assembly illustrated in FIGS. 1-6 of the disclosure.
Figure 8:
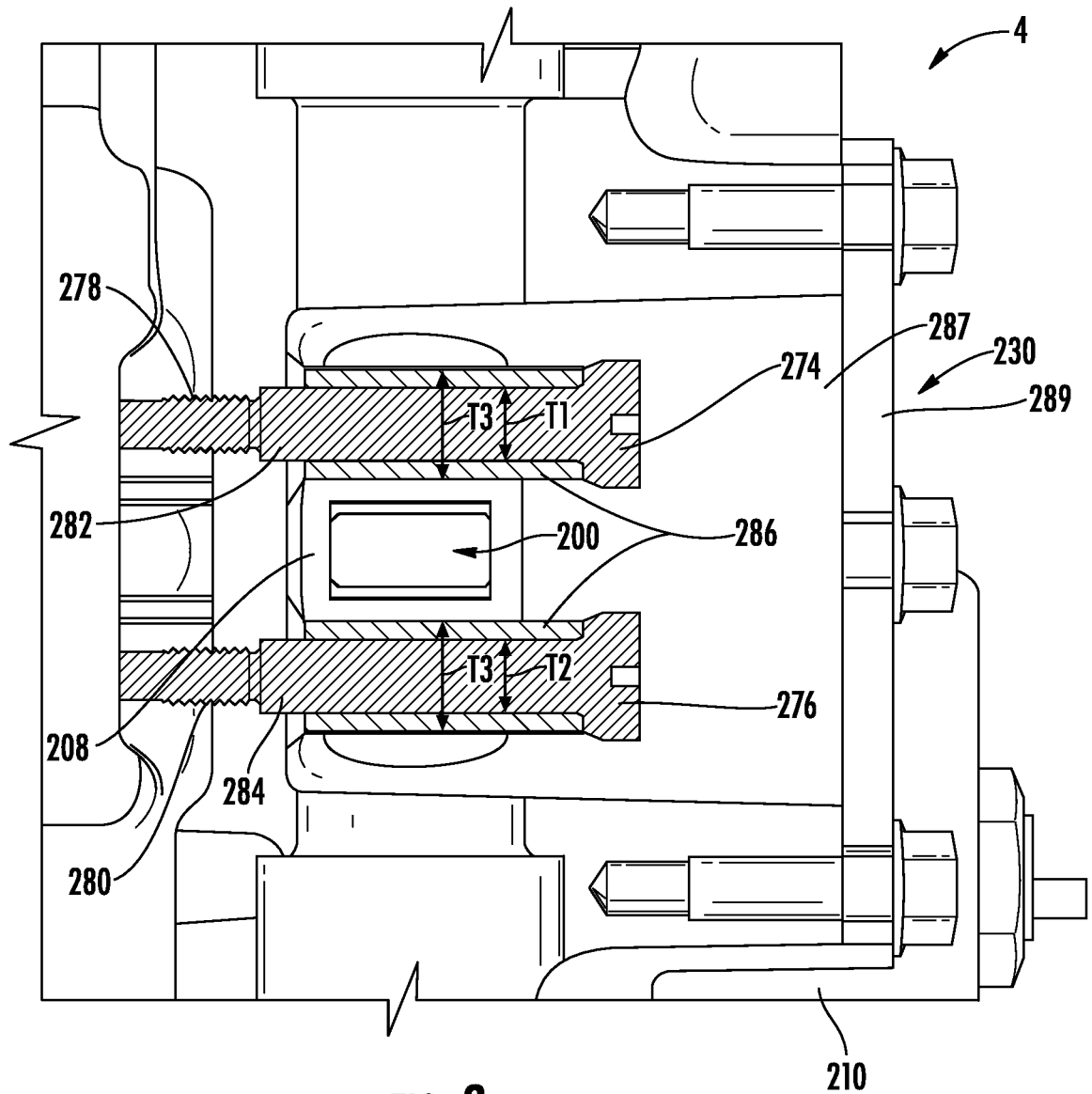
FIG. 8 is a schematic partial cut-away view of a portion of the actuation assembly illustrated in FIGS. 1-7 of the disclosure.

When the actuator shaft 208 is in the first position 230 illustrated in FIGS. 7 and 8, an amount of fluid (not shown) is not applied to the chamber 242 and the one or more first actuator shaft receiving portions 226 of the actuation mechanism 206 and the sliding collar 128 is in the first position 176.

In order to transition the actuator shaft 208 from the first position 230 to the second position 232 illustrated in FIGS. 4 and 6, an amount of fluid (not shown) is supplied to the one or more first actuator shaft receiving portions 226 thereby compressing the one or more first biasing members 269 and loading the one or more first biasing members 269 with an amount of energy. The energy loaded within the one or more first biasing members 269 may be used in order to aid in transitioning the actuator shaft 208 from the second position 232 to the first position 230 when an amount of fluid (not shown) is allowed to exit the one or more first actuator shaft receiving portions 226.

Similarly, in order to transition the actuator shaft 208 from the first position 230 to the third position 234 illustrated in FIG. 5, an amount of fluid (not shown) is supplied to the chamber 242 thereby compressing the one or more second biasing members 268 and loading the one or more second biasing members 268 with an amount of energy. The energy loaded within the one or more second biasing members 268 may be used in order to aid in transitioning the actuator shaft 208 from the third position 234 to the first position 230 when an amount of fluid (not shown) is allowed to exit the chamber 242.

A lever member receiving portion 270 may extend inward into at least a portion of the actuator shaft 208 from at least a portion of the outer surface 212 of the intermediate portion 222 of the actuator shaft 208. The lever member receiving portion 270 may be of a size and shape to receive and/or retain at least a portion of the second end portion 204 of the lever member 200 therein. The lever member 200 of the actuation mechanism 4 translates the linear motion of the actuator shaft 208 into an amount of rotational force in the shift shaft 196 and the shift fork 182 of the actuation assembly 4. As a result, it is therefore to be understood that the interaction between the lever member 200 within the lever member receiving portion 270 in the actuator shaft 208 provides the rotational force needed to selectively translate the sliding collar 128 between the first, second and third positions 176, 178, and 180.

According to the embodiment illustrated in FIGS. 4-6 of the disclosure and as a non-limiting example, the second end portion 204 of the lever member 200 may have an area of increased material thickness 272. By providing the second end portion 204 of the lever member 200 with the area of increased material thickness 272, it allows the actuator shaft 208 to translate linearly a larger amount of distance before a corner of the lever member receiving portion 270 binds or comes into contact with the lever member 200. This allows the actuation assembly 4 to be utilized in a wider range of potential applications. The area of increased material thickness 272 of the lever member 200 in the lever member receiving portion 270 aids in keeping the actuator shaft 208 from rotating within the housing 210 when in operation. This aids in ensuring that the various components of a sensor assembly 288 of the actuation assembly 206 remained aligned.

It is within the scope of this disclosure and as a non-limiting example that the area of increased material thickness 272 of the second end portion 204 of the lever member 200 may have a substantially circular shape. By providing the area of increased material thickness 272 with a substantially circular shape it allows the lever member 200 to pivot within the lever member receiving portion 270 of the actuator shaft 208 easier allowing the actuation assembly 4 to function more efficiently, effectively and reliably.

As best seen in FIGS. 4-8 of the disclosure and as a non-limiting example, the actuation assembly 4 may include one or more first stopper members 274 and/or one or more second stopper members 276. In accordance with the embodiment illustrated in FIG. 8 and as a non-limiting example, at least a portion of a first end portion 278 and 280 of the one or more first and second stopper members 274 and 276 may be selectively attached and/or detached to and/or from at least a portion of the housing 210 of the drive unit assembly 4 at a location proximate the lever member 200. The one or more first and second stopper members 274 and 276 may be used in order to limit the overall amount of movement the lever member 200, the actuator shaft 208, the shift shaft 196 and/or the shift fork 182 are able to experience when in operation. It is within the scope of this disclosure and as a non-limiting example that the one or more first and/or second stopper members 274 and/or 276 may be integrally formed as part of the housing 210 or integrally connectable to at least a portion of the housing 210 as a separate component. As a non-limiting example that the one or more first and/or second stopper members 274 and/or 276 may be one or more mechanical fasteners, one or more dowels, one or more pins, one or more bolts, one or more shoulder bolts, and/or one or more shoulder fasteners.

At least a portion of a body portion 282 and 284 of the one or more first and second stopper members 274 and 276 may have a thickness T1 and T2 respectively. By selectively changing the thickness T1 and/or T2 of the body portions 282 and 284 of the one or more first and second stopper members 274 and 276 the overall amount of movement of the sliding collar 128 can be customized and optimized for a wide array of potential applications. As the thickness T1 and/or T2 increases, the amount of axial movement experiences by the sliding collar 128 decreases. Similarly, as the thickness T1 and/or T2 decreases, the amount of axial movement experienced by the sliding collar 128 increases. By providing the body portion 282 of the first stopper members 274 with a thicknesses T1 that is different than the thickness T2 of the body portion 284 of the one or more second stopper members 276, the location of the sliding collar 128 when in the second and third positions 178 and 180 can be customized and optimized to meet the needs of that particular application. The one or more first and/or second stopper members 274 and/or 276 may be changed out as needed in order to achieve the desired movement of the sliding collar 128. As a result, it is therefore to be understood that the one or more first and/or second stopper members 274 and/or 276 allows the clutch assembly 115 and the actuation assembly 4 to be modular in nature and allows the overall functionality of the clutch assembly 115 and/or the actuation assembly 4 to be altered as needed quickly and efficiently with a minimal amount of disassembly needed.

It is within the scope of this disclosure and as a non-limiting example that the actuation assembly 4 may include the use of one or more sleeve members 286 having a thickness T3. As best seen in FIG. 8 of the disclosure and as a non-limiting example, at least a portion of the one or more sleeve members 286 may be disposed around at least a portion of the body portion 282 and/or 284 of the one or more first and/or second stopper members 274 and/or 276. The one or more sleeve members 286 may be used in order to aid in increasing the overall thickness of the one or more first and/or second stopper members 274 and/or 276 quickly and easily. By selectively changing the thickness T3 of the one or more sleeve members 286, the overall amount of movement of the sliding collar 128 can be customized and optimized for a wide array of potential applications. As the thickness T3 increases, the amount of axial movement experiences by the sliding collar 128 decreases and as the thickness T3 decreases, the amount of axial movement experienced by the sliding collar 128 increases. By providing the one or more sleeve members 286 with different thicknesses, the location of the sliding collar 128 when in the second and third positions 178 and 180 can be customized and optimized to meet the needs of that particular application. The one or more sleeve members 286 may be changed out as needed in order to achieve the desired movement of the sliding collar 128. As a result, it is therefore to be understood that the one or more sleeve members 286 allow the clutch assembly 115 and the actuation assembly 4 to be modular in nature and allows the overall functionality of the clutch assembly 115 and/or the actuation assembly 4 to be altered as needed quickly and efficiently with a minimal amount of disassembly needed.

As best seen in FIG. 8 of the disclosure and as a non-limiting example, the housing 210 may include one or more second openings 287 providing access to the one or more first and/or second stopper members 274 and/or 276 of the actuation assembly 4. One or more second covers 289 may be used in order to seal and/or cover the one or more second openings 287 in the housing 210 as needed. The one or more second covers 289 may be selectively attached and/or detached to and/or from at least a portion of the housing 210 in order to provide quick and easy access to the one or more first and/or second stopper members 274 and/or 276. It is therefore to be understood that the one or more second covers 289 may be removed as needed in order to allow the one or more first stopper members 274, the one or more second stopper members 278 and/or the one or more sleeve members 286 to be changed out as needed in order to obtain the desired movement of the sliding collar 128. This provides an actuation assembly 4 that is quicker, easier and more cost efficient to repair, replace and/or customize the overall movement of the lever member 200 and therefore the sliding collar 128 of the actuation assembly 4. It is within the scope of this disclosure and as a non-limiting example that the one or more second covers 289 may be connected to the housing 210 by using one or more welds, one or more mechanical fasteners, one or more adhesives, one or more retaining rings, a spline connection and/or a threaded connection.

In accordance with the embodiment illustrated in FIGS. 4, 5 and 7 of the disclosure and as a non-limiting example, the actuation assembly 4 may include the use of the sensor assembly 288. The sensor assembly 288 may be in communication with a control unit 290 that is operably configured to determine the position of the actuator shaft 208 and by extension the position of the sliding collar 128. As best seen in FIGS. 4, 5 and 7 of the disclosure and as a non-limiting example, the sensor assembly 288 may include one or more first sensor members 292 connected to at least a portion of the second end 216 or the second end portion 220 of the actuator shaft 208 of the actuation assembly 4. The one or more first sensor members 292 may be able to be detected and/or sensed by one or more second sensor members 294 connected to at least a portion of the housing 210 of the drive unit assembly 2. By accurately determining the location of the end of the actuator shaft 208, the control unit 290 is able to determine whether the sliding collar 128 is in the first position 176, in the second position 178, in the third position 180, in a blocked condition, in a transitioning position between the first and second position 176 and 178 and/or in a transitioning position between the first and third positions 176 and 180. This information may also be used for diagnostic purposes and for generating fault codes in order to determine if there has been a failure within the clutch assembly 115 and/or the actuation assembly 4. For example, if the sensor assembly 288 has determined that the clutch assembly is in the second position 178 and no rotational power is being transitioned from the source of rotational power 6 to the wheel end assemblies (not shown), it can be determined that the clutch assembly is in the first position 176 and a failure has occurred within the clutch assembly 115 and/or the actuation assembly 4.

The actuation assembly 4 may include one or more bushings 296 interposed between the outer surface 212 of the actuator shaft 208 and the surface 258 defining the one or more second actuator shaft receiving portions 252 in the housing 210 of the drive unit assembly 2. The one or more bushings 296 may be used as a guide and in order to reduce the overall amount of friction experienced by the actuator shaft 208 when in operation. By reducing the overall amount of friction experienced by the actuator shaft 208, the overall operability, efficiency, and effectiveness of the actuation assembly 4 can be increased. As best seen in FIGS. 4 and 5 of the disclosure and as a non-limiting example, the one or more bushings 296 may be disposed around at least a portion of the second end portion 220 of the actuator shaft 208 of the actuation assembly 4.

Figure 9:
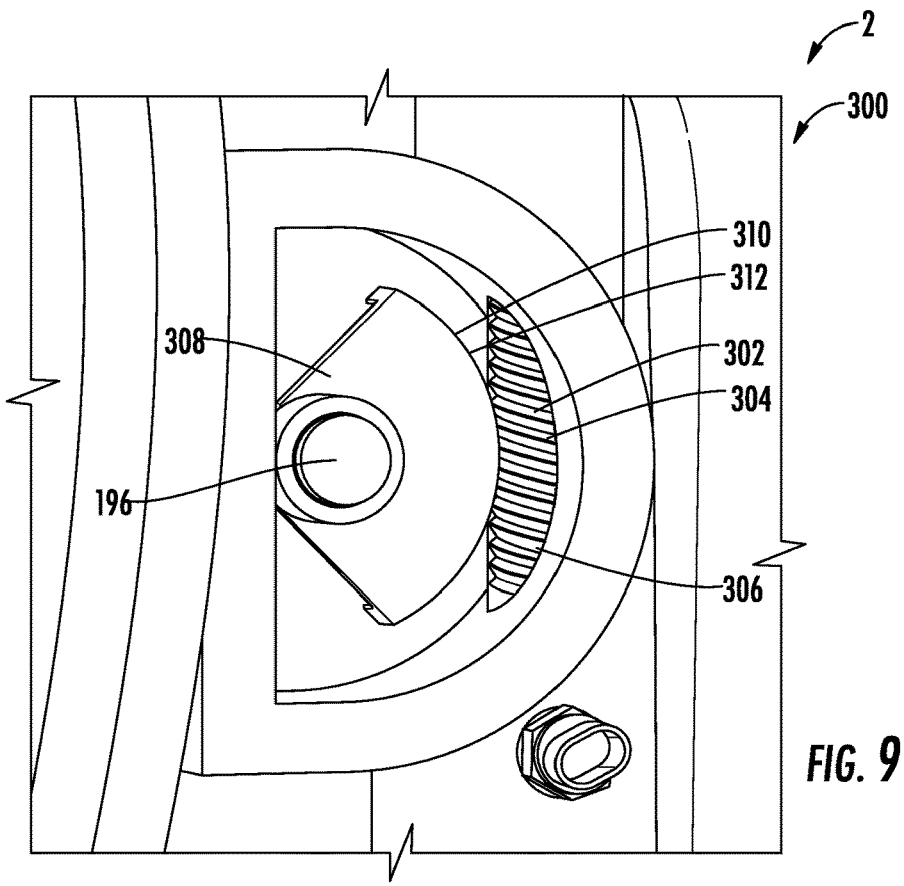
FIG. 9 is a schematic perspective view of a portion of the actuation assembly illustrated in FIGS. 1-8 of the disclosure according to an alternative embodiment of the disclosure.

FIG. 9 is a schematic perspective view of a portion of the actuation assembly 300 according to an alternative embodiment of the disclosure. The actuation assembly 300 illustrated in FIG. 9 is the same as the actuation assembly 4 illustrated in FIGS. 1-8, except where specifically noted below. In accordance with the embodiment illustrated in FIG. 9 and as a non-limiting example, the actuation assembly 300 does not include the use of the actuator shaft 208, the lever 200, the lever member receiving portion 270 of the actuator shaft 208 and/or the actuation mechanism 206 described and illustrated in relation to FIGS. 1-8 of the disclosure.

As illustrated in FIG. 9 of the disclosure and as a non-limiting example, the actuation assembly 300 may include an actuation shaft 302 having an outer surface 304, a first end portion (not shown) and a second end portion (not shown). In accordance with the embodiment illustrated in FIG. 9 and as a non-limiting example, at least a portion of the actuator shaft 302 may be housed within at least a portion of the housing 210 of the drive unit assembly 2. As a result, it is therefore to be understood that at least a portion of the actuator shaft 302 may be received and/or retained within at least a portion of the one or more first and second actuator shaft receiving portions 226 and 252 in the housing 210. At least a portion of the actuator shaft 302 of the actuation assembly 300 may be axially off-set from the shift shaft 196 and may extend substantially transverse or substantially perpendicular to at least a portion of the shift shaft 196 of the actuation assembly 300. As a result of this arrangement, the actuation assembly 300 is able to be more compact and is therefore able to be utilized in a wider range of applications.

The actuator shaft 302 may include a plurality of teeth 306 circumferentially extending along at least a portion of the outer surface 304 of the actuator shaft 302. The plurality of teeth 306 of the actuator shaft 302 may be used in order to provide the force needed to rotate the shift shaft 196 as needed in order to selectively transition the sliding collar 128 between the first, second and third positions 176, 178, and 180. It is within the scope of this disclosure and as a non-limiting example that the actuator shaft 302 may me a worm, a worm shaft, a screw, a worm gear or a worm screw. As a result, it is within the scope of this disclosure and as a non-limiting example that the plurality of teeth 306 on the outer surface 304 of the actuator shaft 302 may be a plurality of gear teeth, a plurality of worm gear teeth or a plurality of threads.

At least a portion of the first end portion (not shown) of the actuator shaft 302 may be connected to an actuation mechanism (not shown). The actuation mechanism (not shown) may be used in order to selectively rotate the actuator shaft 302 as needed to selectively transition the sliding collar 128 between the first, second and third positions 176, 178, and 180 illustrated in FIGS. 2-5 of the disclosure as needed. It is within the scope of this disclosure and as a non-limiting example that the actuation mechanism (not shown) may be an electric motor, a worm drive, a pneumatic actuator, a hydraulic actuator, linear actuator, a lever, and/or a gear assembly.

In accordance with the embodiment illustrated in FIG. 9 of the disclosure and as a non-limiting example, the actuator assembly 300 may include a gear member 308 connected to at least a portion of the first end portion 198 of the shift shaft 196 of the actuator assembly 300. The gear member 308 may be used in order to transition the rotational energy from the actuator shaft 302 into an amount of rotational energy needed to have the shift fork 182 selectively transition the sliding collar 128 between the first, second and third positions 176, 178 and 180. It is within the scope of this disclosure and as a non-limiting example that at least a portion of the gear portion 308 may be integrally formed as part of the shift shaft 196 or may be integrally connected to at least a portion of the shift shaft 196 as a separate component. According to the embodiment when the gear member 308 is a separate component from the shift shaft 196, the gear member 308 may be integrally connected to at least a portion of, the shift shaft 196 by using one or more welds, one or more mechanical fasteners, one or more adhesives, a threaded connection and/or a spline connection.

The gear member 308 of the actuator assembly 300 may include a plurality of teeth 310 circumferentially extending along at least a portion of an outer surface 312 of the gear member 308. At least a portion of the plurality of teeth 310 on the gear member 308 may be complementary and meshingly engaged with at least a portion of the plurality of teeth 306 on the outer surface 304 of the actuator shaft 302. The meshing relationship between the gear portion 308 and the actuator shaft 302 allows for the transmission of an amount or force needed from the actuation mechanism (not shown) to the shift fork 182 to selectively transition the sliding collar 128 between the first, second and third positions 176, 178 and 180. As a result, it is within the scope of this disclosure and as a non-limiting example that the gear member 308 may be a worm gear, a crescent gear or a worm wheel.

Figure 10:
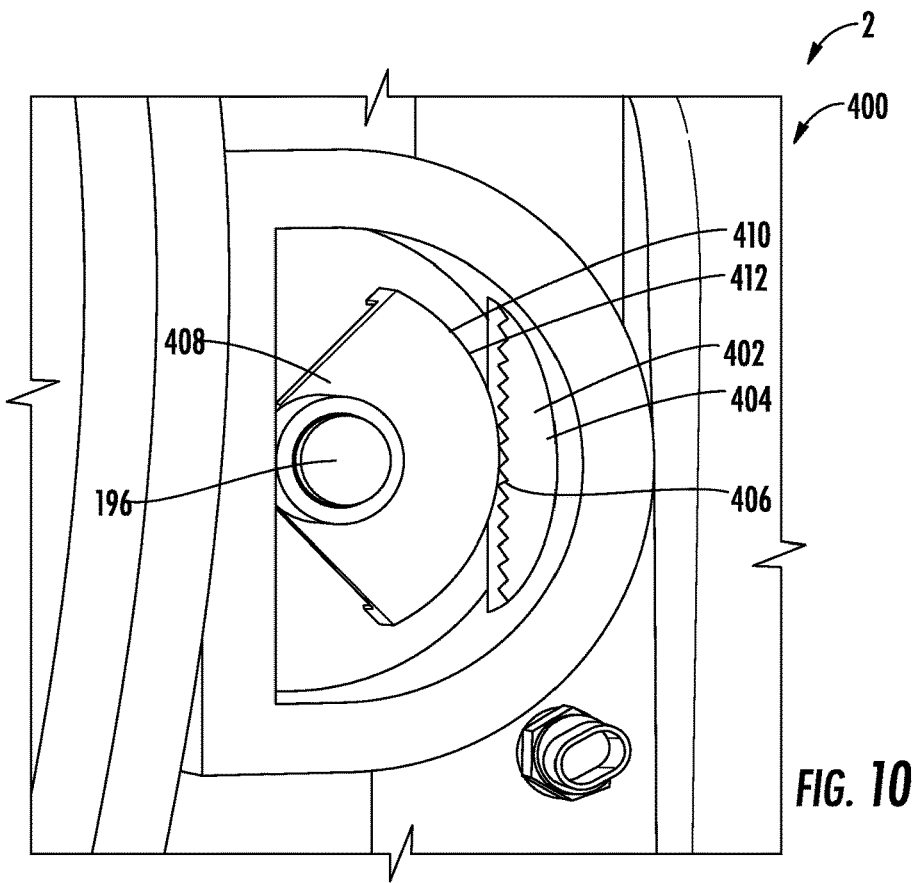
FIG. 10 is a schematic perspective view of a portion of the actuation assembly illustrated in FIGS. 1-9 of the disclosure according to another embodiment of the disclosure.

FIG. 10 is a schematic perspective view of a portion of the actuation assembly 300 according to another embodiment of the disclosure. The actuation assembly 400 illustrated in FIG. 10 is the same as the actuation assembly 4 and 300 illustrated in FIGS. 1-9, except where specifically noted below. In accordance with the embodiment illustrated in FIG. 10 and as a non-limiting example, the actuation assembly 400 does not include the use of the actuator shaft 208, the lever 200 and/or the lever member receiving portion 270 of the actuator shaft 208 described and illustrated in relation to FIGS. 1-8 of the disclosure.

As illustrated in FIG. 10 of the disclosure and as a non-limiting example, the actuation assembly 400 may include an actuation shaft 402 having an outer surface 404, a first end portion (not shown) and a second end portion (not shown). In accordance with the embodiment illustrated in FIG. 10 and as a non-limiting example, at least a portion of the actuator shaft 402 may be housed within at least a portion of the housing 210 of the drive unit assembly 2. As a result, it is therefore to be understood that at least a portion of the actuator shaft 402 may be received and/or retained within at least a portion of the one or more first and second actuator shaft receiving portions 226 and 252 in the housing 210. At least a portion of the actuator shaft 402 of the actuation assembly 400 may be axially off-set from the shift shaft 196 and may extend substantially transverse or substantially perpendicular to at least a portion of the shift shaft 196 of the actuation assembly 400. As a result of this arrangement, the actuation assembly 400 is able to be more compact and is therefore able to be utilized in a wider range of applications.

The actuator shaft 402 may include a plurality of teeth 406 circumferentially extending along at least a portion of the outer surface 404 of the actuator shaft 402. The plurality of teeth 406 of the actuator shaft 402 may be used in order to provide the force needed to rotate the shift shaft 196 as needed in order to selectively transition the sliding collar 128 between the first, second and third positions 176, 178, and 180. It is within the scope of this disclosure and as a non-limiting example that the plurality of teeth 406 on the outer surface 404 of the actuator shaft 402 may be a plurality of gear teeth.

At least a portion of the first end portion (not shown) of the actuator shaft 402 may be connected to at least a portion of the actuation mechanism 206 of the drive unit assembly 2. The actuation mechanism 206 may be used in order to drive the actuator shaft 402 in a linear manner. As a result, it is therefore to be understood that the actuation mechanism 206 may be operably configured in order to selectively transition the actuator shaft 402 between the first, second and/or third positions (not shown) which in turn selectively translates the sliding collar 128 between the first, second and/or third positions 176, 178 and/or 180.

In accordance with the embodiment illustrated in FIG. 10 of the disclosure and as a non-limiting example, the actuator assembly 400 may include a gear member 408 connected to at least a portion of the first end portion 198 of the shift shaft 196 of the actuator assembly 400. The gear member 408 may be used in order to transition the linear energy from the actuator shaft 402 into an amount of rotational energy needed to have the shift fork 182 selectively transition the sliding collar 128 between the first, second and third positions 176, 178 and 180. It is within the scope of this disclosure and as a non-limiting example that at least a portion of the gear portion 408 may be integrally formed as part of the shift shaft 196 or may be integrally connected to at least a portion of the shift shaft 196 as a separate component. According to the embodiment when the gear member 408 is a separate component from the shift shaft 196, the gear member 408 may be integrally connected to at least a portion of the shift shaft 196 by using one or more welds, one or more mechanical fasteners, one or more adhesives, a threaded connection and/or a spline connection.

The gear member 408 of the actuator assembly 400 may include a plurality of teeth 410 circumferentially extending along at least a portion of an outer surface 412 of the gear member 408. At least a portion of the plurality of teeth 410 on the gear member 408 may be complementary and meshingly engaged with at least a portion of the plurality of teeth 406 on the outer surface 404 of the actuator shaft 402. The meshing relationship between the gear portion 408 and the actuator shaft 402 allows for the transmission of an amount or force needed from the actuation mechanism (not shown) to the shift fork 182 to selectively transition the sliding collar 128 between the first, second and third positions 176, 178 and 180. As a result, it is within the scope of this disclosure and as a non-limiting example that the gear member 408 may be a crescent gear.

It is therefore to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. An actuation assembly, comprising:
   an actuator shaft;
   a shift shaft;
   a shift fork connected to at least a portion of said shift shaft;
   a lever member connected to at least a portion of said shift shaft and pivotably connected to at least a portion of said actuator shaft;
   one or more first stopper members and/or one or more second stopper members;
   one or more sleeve members disposed around at least a portion of said one or more first stopper members and/or said one or more second stopper members;
   wherein said one or more sleeve members have a thickness needed to limit movement of said lever member and allow a sliding collar to selectively transition between a first position, a second position and/or a third position; and
   an actuation mechanism selectively transitioning said sliding collar between said first position, said second position, and/or said third position.

2. The actuation assembly of claim 1, wherein said actuation mechanism is a pneumatic actuator, a hydraulic actuator or a linear actuator.

3. The actuation assembly of claim 1, wherein at least a portion of said actuator shaft is axially off-set from and extends substantially transverse to or substantially perpendicular to at least a portion of said shift shaft.

4. The actuation assembly of claim 1, wherein said lever member has a first end portion and a second end portion;
   wherein at least a portion of said first end portion of said lever member is connected to at least a portion of said shift shaft; and
   wherein at least a portion of said second end portion of said lever member is pivotably received within at least a portion of a lever member receiving portion extending inward into at least a portion of said actuator shaft.

5. The actuation assembly of claim 4, wherein at least a portion of said second end portion of said lever member has an area of increased material thickness having a substantially circular shape.

6. The actuation assembly of claim 1, wherein said shift fork and/or said lever member are integrally formed as part of said shift shaft, or wherein said shift fork and/or said lever may be separate components that are selectively attachable and/or detachable to and/or from each other.

7. The actuation assembly of claim 1, wherein said sliding collar has one or more engagement portions that are selectively engagable with at least a portion of said shift fork.

8. The actuation assembly of claim 7, wherein said one or more engagement portions of said sliding collar are one or more grooves circumferentially extending along at least a portion of an outer surface thereof;
- wherein said one or more grooves in said outer surface of said sliding collar are of a size and shape to receive and/or retain at least a portion of said shift fork therein; and
- wherein said shift fork selectively transitions said sliding collar between said first position, said second position and/or said third position.

9. The actuation assembly of claim 7, wherein said shift fork has one or more engagement portions that are engagable with at least a portion of said one or more engagement portions of said sliding collar.

10. The actuation assembly of claim 9, wherein said one or more engagement portions of said shift fork are integrally formed as part of said shift fork or rotationally connected to at least a portion of said shift fork.

11. The actuation assembly of claim 1,
- wherein said one or more first stopper members, said one or more second stopper members, and/or said one or more sleeve members provide a positive stop preventing said lever member from moving beyond a predetermined amount.

12. The actuation assembly of claim 1, wherein said body portion of said one or more first and/or second stopper members have a thickness needed to aid in selectively transition a sliding collar between a first position, a second position and/or a third position.

13. The actuation assembly of claim 1, wherein said one or more first and/or second stopper members are integrally formed as part of a housing or said one or more first and/or second stopper members are selectively attachable and/or detachable to and/or from said housing; and/or
- wherein a housing has one or more second openings providing access to said one or more first stopper members, said one or more second stopper members and/or said one or more sleeves.

14. The actuation of claim 13, wherein one or more second covers are selectively attachable and/or detachable to and/or from said housing in order to seal off and/or provide access to said one or more first stopper members, said one or more second stopper members and/or said one or more sleeves through said one or more second openings in said housing.

15. The actuation assembly of claim 1, further comprising a sensor assembly having one or more first sensor members and/or one or more second sensor members; and
- wherein a control unit is connected to said one or more first sensors and/or one or more second sensors and is operably configured to determine said position of said actuator shaft and/or a sliding collar.

16. The actuation assembly of claim 1, wherein said actuation mechanism drives said actuator shaft linearly to pivot said lever member which in turn rotates said shift shaft and said shift fork.

* * * * *